United States Patent [19]

Ota et al.

[11] Patent Number: 5,166,817

[45] Date of Patent: Nov. 24, 1992

[54] LIQUID CRYSTAL DISPLAY WITH COMPENSATION MEANS OF MULTIAXIALLY ELONGATED HIGH POLYMER FILMS

[75] Inventors: Isao Ota, Osaka; Katsuhiko Kumagawa, Neyagawa; Shingo Fujita, Kitakatsuragi; Hiroshi Yamazoe, Katano; Shigeru Yoshida, Osaka; Toshio Tatsumichi, Ikoma, all of Japan

[73] Assignee: Matsushita Electric Industrial Co., Ltd., Osaka, Japan

[21] Appl. No.: 254,085

[22] Filed: Oct. 6, 1988

[30] Foreign Application Priority Data

| Oct. 7, 1987 [JP] | Japan | 62-252925 |
| Jan. 8, 1988 [JP] | Japan | 63-2853 |
| Jan. 18, 1988 [JP] | Japan | 63-7774 |
| Jun. 27, 1988 [JP] | Japan | 63-158570 |

[51] Int. Cl.⁵ .................................. G02F 1/1335
[52] U.S. Cl. .................................................. 359/73
[58] Field of Search ............... 350/347 R, 337, 339 R; 359/73

[56] References Cited

U.S. PATENT DOCUMENTS

| 4,443,065 | 4/1984 | Funada et al. ................... 350/335 |
| 4,664,482 | 3/1987 | Kando et al. ................... 350/347 E |
| 4,711,530 | 12/1987 | Nakanowatari et al. ....... 350/339 R |
| 4,844,569 | 7/1989 | Wada et al. ...................... 350/347 R |
| 4,852,976 | 8/1989 | Suzuki ................................ 350/337 |
| 4,957,349 | 9/1990 | Clere et al. ...................... 350/347 R |
| 4,995,704 | 1/1991 | Yamamoto et al. ............. 350/347 R |
| 5,093,739 | 3/1992 | Aida et al. ............................ 359/73 |

FOREIGN PATENT DOCUMENTS

| 0246842 | 11/1987 | European Pat. Off. |
| 2595156 | 9/1987 | France |
| 0045037 | 3/1980 | Japan ............................ 350/337 |
| 1470523 | 4/1977 | United Kingdom ........... 350/347 R |
| 2028527 | 3/1980 | United Kingdom |
| 2092769 | 8/1982 | United Kingdom |

OTHER PUBLICATIONS

Jee-Journal of Electrical Engineering, vol. 14, No. 249, (Sep. 1987, pp. 37–40, Tokyo, JP; Y. Shigeno et al.: "Super-Twisted Nematic Liquid Crystal Display".
Applied Optics, vol. 14, No. 1, Jan. 1975, pp. 229–237; A. M. Title: "Improvement of Birefringent Filters. 2:Achromatic Waveplates".
Applied Optics, vol. 18, No. 20, Oct. 1979, pp. 3443–3456, Optical Society of America; A. M. Title et al. "Improvements in Birefringent Filters. 5: Field of View Effects".
Journal of Applied Physics, vol. 48, No. 4, Apr. 1977, pp. 1426–1431, American Institute of Physics; M. Goscianski: "Optical Characteristics of Twisted Liquid Crystals".
Applied Optics, vol. 16, No. 8, Aug. 1977, pp. 2090–2096; J. E. Bigelow et al.: "Poincare Sphere Analysis of Liquid Crystal Optics".
Scanning Limitations of Liquid-Crystal Displays by Alt et al.
Article by Dwight Berreman, Journal of the Optical Society of America, vol. 62, No. 4, Apr. 1972.

Primary Examiner—Stanley D. Miller
Assistant Examiner—Anita Pellman Gross
Attorney, Agent, or Firm—Wenderoth, Lind & Ponack

[57] ABSTRACT

A liquid crystal display comprises as liquid crystal panel having a liquid crystal layer disposed between electrode layers, polarizers disposed at both sides of the panel, and a solid birefringent film having the maximum refractive index direction varying with its depth and disposed at at least one side of the liquid crystal panel between the polarizers. The solid birefringent film conpensates the dependence of the polarization characteristic on wave length, thus being capable of obtaining either a monochrome display or a display having an extremely low coloration.

3 Claims, 9 Drawing Sheets

LIQUID CRYSTAL DISPLAY WITH COMPENSATION MEANS OF MULTIAXIALLY ELONGATED HIGH POLYMER FILMS

BACKGROUND OF THE INVENTION

1. This invention relates to a display unit using liquid crystal.

2. Description of the Prior Art

Conventionally, liquid crystal displays of so-called super-twisted nematic (STN) type having liquid crystal molecules whose twist angle ranges from 180 to 270 deg. have been available as a unit that has a large display capacity with low-cost passive matrix structure. The STN liquid crystal displays are disadvantageous in that coloration is accompanied with use of the birefringent mode, thus research and development works aiming at those for displaying it in a monochrome pattern have been largely progressed recently. Out of which, what is most superior in display characteristic and can be expected to have a bright future is of the type which has two liquid crystal layers consisting of STN liquid crystal layer and optical compensation liquid crystal layer added thereto for the achromatic purpose. The liquid crystal displays structured as above are described in detail in, for example, Nikkei Microdevices, No. 10, pp. 84 through 88, October 1987. Also, for those having two-layer structure of TN liquid crystal with a twist angle of 90 deg., based on the same principle as above, to improve the display contrast, U.S. Pat. No. 4,443,065 by Funada et al is known. This two-layer type liquid crystal display unit is structured so that two liquid crystal layers whose retardations, i.e., the product ($\Delta n \cdot d$) of the birefringence ($\Delta n$) of liquid crystal and the thickness (d) of the liquid crystal layer, and twist angles are approximately identical to each other, and whose directions to be twisted are reverse to each other may be arranged so as to make their molecular longitudinal axes approximately perpendicular to each other at the interface. The case when a voltage is not applied to the liquid crystal layer used for the display purpose, or it is applied at a value below the threshold will be considered here. Input light is linearly polarized through a polarizer and by successively passing through the liquid crystal layer used for the display purpose, the dependence of state of polarization on wave length is generated. However, the optical compensation liquid crystal layer compensates the dependence of state of polarization on wave length by being structured as shown above, thus the output light being returned to the original linear polarization independently of the wave length. As a result, if the plane of absorption of the electric vector of the polarizer disposed at the output side is arranged so as to be parallel with this, complete black display condition can be obtained. On the other hand, by appropriately selecting the values of the above-mentioned parameters, a pixel to which a selected voltage is applied can be displayed in the white condition. In this case, the state of polarization in the selected pixel is not perfectly linear, but slightly depends on the wave length. However, substantially satisfactory white display condition can be obtained in practice for the reasons that two liquid crystal layers, one is for the display use and the other for the optical compensation use, are directed so that the dependence on wavelength can be, although not perfectly, cancelled, and slight dependence of state of polarization on wave length or the existence of elliptically polarized light component cannot so largely effect on the white display condition as in the black display condition.

As described above, conventional liquid crystal displays are required to dispose one more liquid crystal layer than STN liquid crystal displays, which means that there have been arisen some problems such as a cost increase caused by manufacturing process or material cost and a increase in thickness or weight of the unit.

SUMMARY OF THE INVENTION

An object of this invention is to provide a liquid crystal display having optical compensation means simple in manufacture and low in material cost thereby to reduce the manufacturing cost and to make the unit small in thickness and light in weight.

In order to attain the above-mentioned object, the liquid crystal display unit of this invention has such a structure as a birefringent solid film whose maximum refractive index direction varies with the depth in the film is arranged at at least one side of a liquid crystal panel which is disposed between two polarizers.

As structured as above, the display unit of this invention emphasizes that a solid film is used as the optical compensation means in lieu of the optical compensation liquid crystal layer of conventionally proposed two-layer type liquid crystal panel thereby compensating the dependence of state of polarization on wave length resulted from the use of such a liquid crystal layer. Thus, since the liquid crystal layer used for the optical compensation purpose so structured as in the prior art becomes no need to form, the following effects can be obtained:

(1) Materials and manufacturing processes for preparing the liquid crystal panel used for the optical compensation purpose are not necessary, and such a film as is low in material cost and superior in mass-productivity is used, so that even if it is laminatedly structured, the general cost can be reduced;

(2) The thickness per film ranges from several to several tens microns, so that even if it is laminatedly structured, the thickness and weight of the unit are smaller than those of the liquid crystal panel used for the optical compensation purpose using two glass substrates, thus resulting in a compact liquid crystal display unit;

(3) The total thickness of the liquid crystal panel used for the display purpose disposed between two polarizers and the optical compensation means can be made smaller than that of the conventionally proposed two-layer type one, thus capable of improving the visible angle characteristic;

(4) By combinedly use of the anisotropy of birefringent film, the degree of freedom in the design of optical compensation plate can be extended, so that compatibility of the liquid crystal panel to various types of modes or meetability to characteristics that are desired are possibly increased;

(5) The birefringent film is more easily controllable in thickness than the liquid crystal film particularly when display area is large, which means that it is superior in the compatibility to a large panel;

(6) The optical compensation means of birefringent film is flexible and easy to be attached to the liquid crystal panel for the display use, so that an air layer can be eliminated to be formed between the liquid crystal panel and the optical compensation means, which means that multireflection can be decreased, thus resulting in an increase in contrast and transmittance; and (7) Film layers and polarizers can be integratedly laminated in structure, thus contributing to an outstanding reduction in cost or the number of manufacturing processes.

Therefore, a liquid crystal display unit which has a display characteristic such as, for example, monochrome display or high contrast, be small in the thickness and light in weight with a low price can be provided.

DESCRIPTION OF THE PREFERRED EMBODIMENTS

EXAMPLE 1

Figure 1:
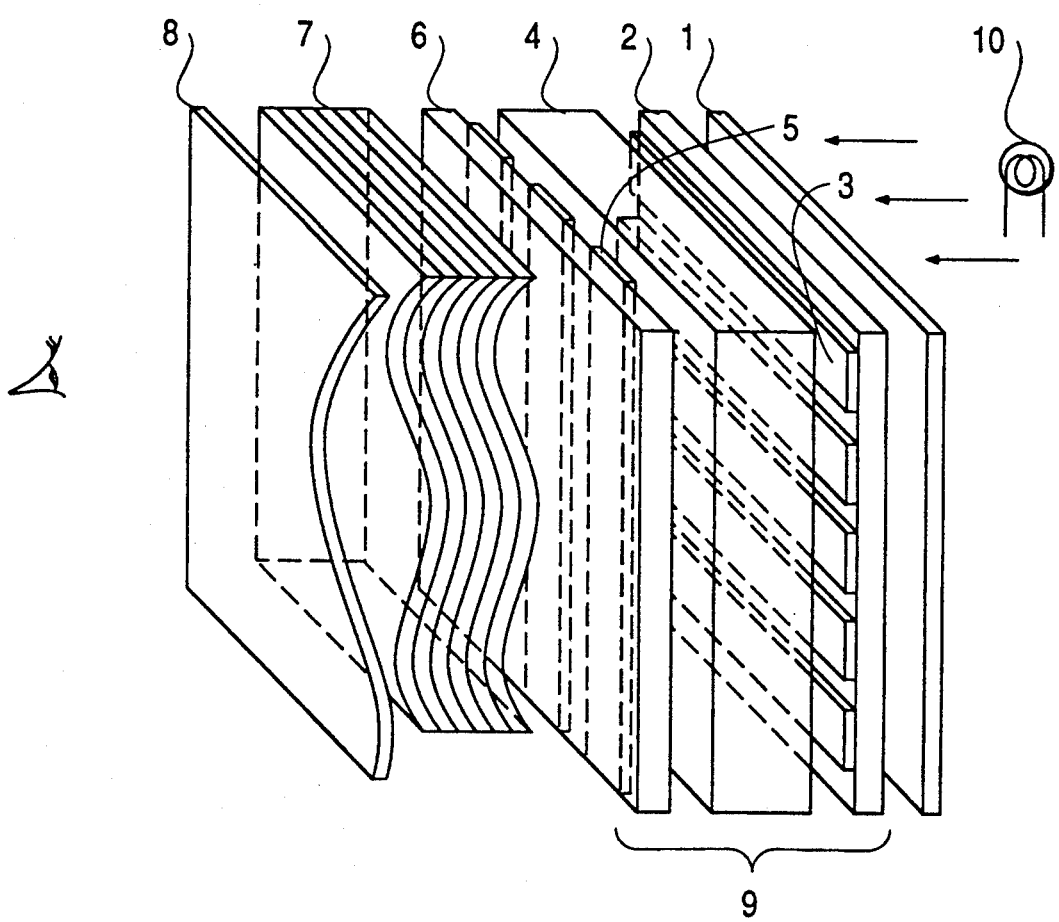
FIG. 1 is an exploded view showing a structure of a liquid crystal display of this invention.
Figure 2:
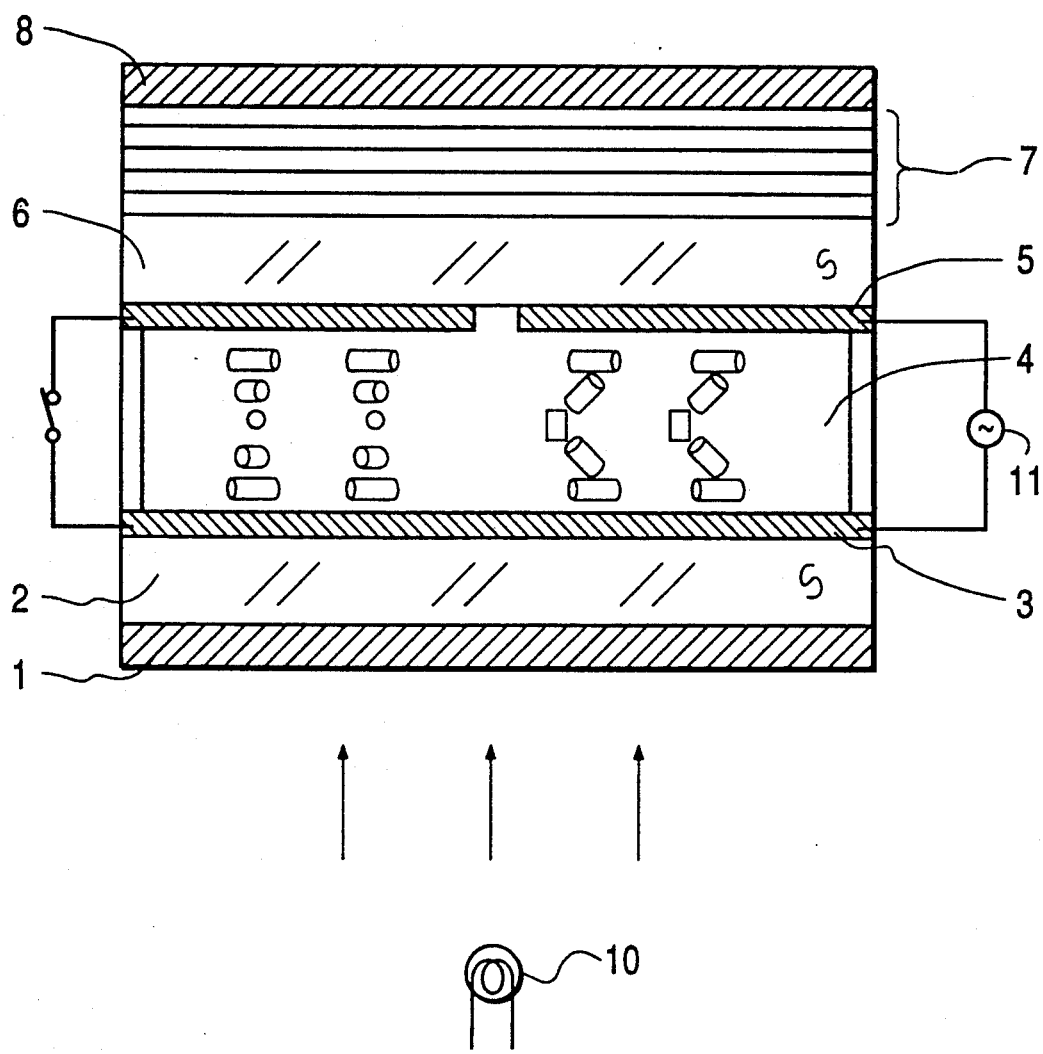
FIG. 2 is a sectional view of the liquid crystal display of this invention.

Referring to FIGS. 1 and 2, polarizers 1 and 8 are characterized so that linearly polarized light component having specific plane of vibration of the electric vector of an input light can be passed therethrough. The reference numeral 9 indicates a liquid crystal panel having a liquid crystal layer 4, electrode layers 3 and 5 between which the liquid crystal layer 4 is disposed, and substrates 2 and 6. The electrode layers 3 and 5 are a transparent conductor having indium oxide as the main composition and tin oxide added thereto at 5 to 10%, which are patterned in a stripe shape perpendicularly to each other and serve to apply a voltage to the liquid crystal layer 4 of a pixel portion patterned in a matrix shape. The liquid crystal layer 4 is of STN-type liquid crystal having a twist angle of 180 to 360 deg., preferably 200 to 300 deg. The reference numeral 7 indicates optical compensation means made of solid films.

Figure 3:
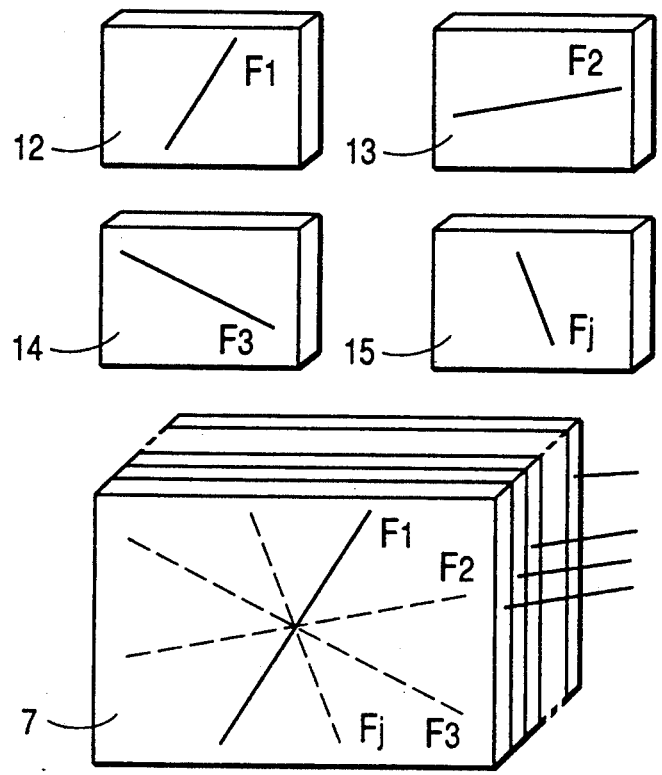
FIG. 3 is an exploded view showing a structure of laminated films.
Figure 4:
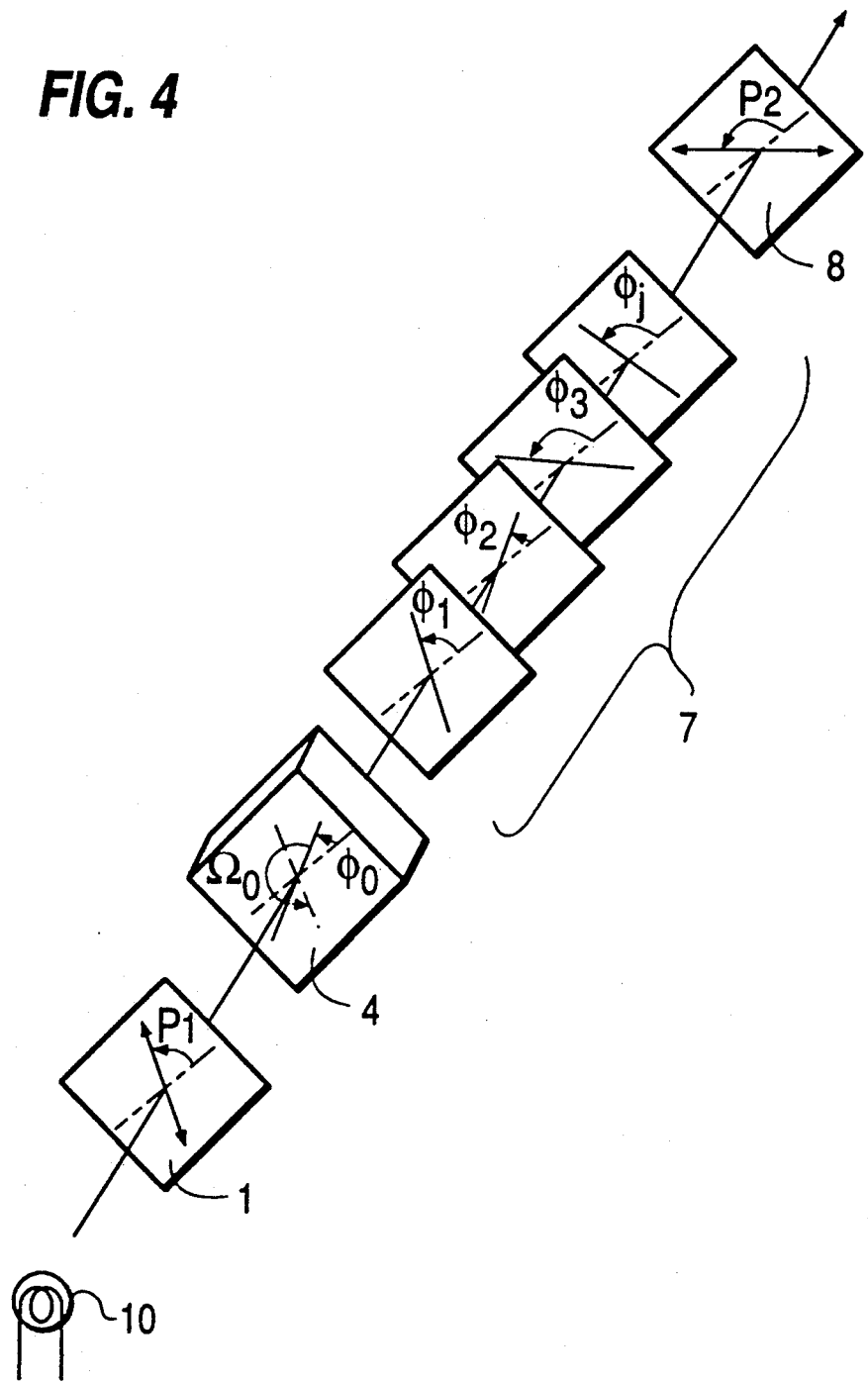
FIG. 4 is an exploded view showing an arrangement of the plane of vibration of the electric vector of the polarizers, alignment direction of liquid crystal molecule and the direction in which the refractive index of the film becomes maximum.

The liquid crystal panel of this invention can be prepared as follows:

The electrode layers 3 and 5 are formed with a specific pattern on the substrates 2 and 6 through the photolithography technology and then, alignment is made on the interfaces where the liquid crystal layer 4 contacts the substrates 2 and 6 and the electrode layers 3 and 5 in order to have liquid crystal molecules aligned at a tilt angle with a desired direction on the surfaces of the substrates. As the method of alignment, for example, coated and cured polyimide can be rubbed on substrate or silicon dioxide can be obliquely evaporated thereon. Spacer made of either glass or plastic is spread on the substrates 2 and 6 having been processed as shown above, the peripheral portions of the both substrates are pasted with a sealant of epoxy resin, a nematic liquid crystal material (for example, Melk's ZL1-2293) having a chiral material (Melk's S811) added at about 1% is injected thereinto and the inlet is sealed, thus the liquid crystal panel 9 being manufactured. FIG. 3 shows an example of the structure of the optical compensation means 7. In FIG. 3, F1, F2, F3 ..., and Fj respectively show directions in which refractive indices of the birefringent films 12 through 15 become maximum in their surfaces. The birefringent films 12 through 15 are laminated so that each of F1, F2, F3 ..., and Fj can have a specific direction. In addition, the suffixes attached 1, 2, 3, ..., and j are taken in this order from one nearest to the liquid crystal layer. FIG. 4 defines the position of each structural member in the path of a light. The horizontal direction is defined as the reference axis and the direction counterclockwise to the direction that the light goes through is made positive. Angles P1 and P2 of planes of vibration of the electric vector of the polarizers 1 and 8, and angle $\phi 0$ of the molecular longitudinal axis on the input side of the liquid crystal layer 4, angles $\phi 1, \phi 2, \phi 3 \ldots$, and $\phi j$ of the F1, F2, F3 ..., and Fj of the film layer 7 are respectively defined. Also, $\Omega 0$ is a twist angle of molecule of the liquid crystal layer.

For the solid films layer making the optical compensation means 7, uniaxially elongated high polymer film can be laminatedly used. In this case, the film is uniaxial optically and its refractive index becomes maximum in the elongated direction. This uniaxially elongated film can be prepared, for example, by the following procedures.

First, a polyvinylalcohol film is heated at a temperature of 80° to 150° C. and then, elongated to make a film having a desired value of $\Delta n \cdot d$. After elongated, if the film thus elongated is adhered with a film such as, for example, cellulose triacetate film using an adhesive agent in order to make it stabilize to temperature and humidity and to reinforce its mechanical strength, the subsequent handlings of the film can be easy. The film layer used for the reinforcement purpose is preferable to be what is optically isotropic and has no effect on the state of polarization. However, if its $\Delta n \cdot d$ value is below 2% of that of the polyvinylalcohol film layer, no problem arises practically. If not so, it is required to review the arrangement of films by giving considerations to the effects of this film.

Next, uniaxially elongated films prepared as shown above (or composite films) are adhered with an adhesive agent so as to be arranged in a specific position, thus the optical compensation means 7 being able to prepare.

In addition, if a composite film which is made by adhering a polyvinylalcohol film with a reinforcement film in advance is elongated and used for lamination of the means, the same optical compensation means 7 as shown above can be obtained. The optical compensation means 7 thus prepared is securely affixed to the liquid crystal panel 9 with an adhesive agent and further, the polarizers 1 and 8 are adhered thereto with an adhesive agent, thus the liquid crystal display unit of EXAMPLE 1 of this invention being completed to manufacture.

The optical compensation means 7 consisting of solid films can be formed as shown, for example, in the following three examples:

EXAMPLE 1—1

This EXAMPLE is one that the twisted structure of the liquid crystal layer used for the display purpose of conventional two-layer type liquid crystal display unit is approximated by using films. That is, a plurality of uniaxially elongated films having a value of $\Delta n \cdot d$ equal to each other were used in such a way that the plane of vibration of the electric vector F1 of the first film is arranged so as to make about right angle with the longitudinal axis of liquid crystal molecule of the liquid crystal layer 4 on the surface of the substrate disposed at the film side, planes of vibration of the electric vector F2, F3 . . . , and Fj of the second film and subsequent films are respectively arranged so as to be twisted successively therefrom by an equal angle in the opposite direction to the liquid crystal layer 4. The total angle to be twisted and the sum of the $\Delta n \cdot d$ values of the films layer were made approximately identical to those of the liquid crystal layer 4. Also, the direction of the plane of vibration of the electric vector of the polarizer 1 was made so as to make about 45 deg. with the longitudinal axis of liquid crystal molecule at the input light side and the plane of vibration of the electric vector of the polarizer 8 was arranged so as to make about right angle with the plane of vibration of the electric vector of the polarizer 1. When a voltage was applied to each pixel to do a display using the signal voltage applying means 11, the pixel to which selected voltage was applied was displayed in white, and the pixel to which non-selected voltage was applied was displayed in black.

obtained which is superior in display characteristic, low in cost, small in thickness and light in weight.

As described above, according to this EXAMPLE, a liquid crystal display having outstanding monochrome display characteristic, being light in weight and inexpensive, can be obtained by laminating laminated films which are arranged in such a way that the direction of making the refractive index of each film maximum is twisted to the reverse direction to that of the liquid crystal layer onto the liquid crystal layer. In addition, the optical compensation means 7 of this EXAMPLE was disposed at the side from which observation is made against the liquid crystal panel 9, but the same effect can be obtained if it was disposed at the reverse side thereto. Further in addition, the liquid crystal display of this EXAMPLE is made to equip with a light source 10, but it can be structured so as to use the outdoor daylight with a help, for example, of a reflector.

EXAMPLE 1-2

This EXAMPLE is to improve the compensation characteristic by giving considerations upon the optical propagation characteristic within the liquid crystal layer 4. That is, the change of state of polarization within the liquid crystal layer 4 is determined through calculations or experiments, and films are arranged so as to return the change thus determined to the original state.

Table 1 shows examples of the arrangement of each layer of the liquid crystal display of this EXAMPLE according to the notation of FIG. 4.

TABLE 1

| No. | The number of films | P1 (deg) | P2 (deg) | Liquid crystal layer | | | Compensation film layer (upper; $\Delta n \cdot d$ ($\mu$m), lower; $\Phi$ (deg)) | | | | | | | | |
|---|---|---|---|---|---|---|---|---|---|---|---|---|---|---|---|
| | | | | $\Delta n \cdot d$ ($\mu$m) | $\Phi 0$ (deg) | $\Omega 0$ (deg) | 1st | 2nd | 3rd | 4th | 5th | 6th | 7th | 8th | 9th |
| 1 | 8 | 75 | −15 | 0.82 | 30 | −240 | 0.11 −100 | 0.11 −80 | 0.11 −40 | 0.11 −20 | 0.11 20 | 0.11 40 | 0.11 80 | 0.11 100 | — — |
| 2 | 9 | 75 | −15 | 0.90 | 30 | −240 | 0.072 −119 | 0.11 −86 | 0.11 −66 | 0.11 −30 | 0.11 −10 | 0.11 26 | 0.11 46 | 0.11 82 | 0.11 102 |
| 3 | 8 | 75 | −15 | 0.85 | 30 | −240 | 0.083 −102 | 0.12 −83 | 0.12 −38 | 0.12 −22 | 0.12 20 | 0.12 39 | 0.12 79 | 0.12 100 | — — |
| 4 | 8 | 0 | 90 | 0.85 | 30 | −240 | 0.126 −94 | 0.125 −69 | 0.126 −28 | 0.129 −13 | 0.126 29 | 0.124 54 | 0.127 96 | 0.035 114 | — — |
| 5 | 9 | 90 | 0 | 0.85 | 45 | −270 | 0.071 −129 | 0.105 −94 | 0.105 −72 | 0.105 −32 | 0.105 −10 | 0.105 30 | 0.105 53 | 0.105 92 | 0.105 115 |
| 6 | 9 | 90 | 0 | 0.90 | 45 | −270 | 0.11 −126 | 0.11 −86 | 0.11 −65 | 0.11 −25 | 0.11 −4 | 0.11 36 | 0.11 57 | 0.11 97 | 0.086 119 |

In this EXAMPLE, if the value of $\Delta n \cdot d$ of each film is decreased and the number of films is increased infinitely, the function of the optical compensation means 7 will become completely identical to that of the liquid crystal layer used for the display purpose, so that an extremely improved optical compensation characteristic and the black display condition accompanied therewith can be obtained. The use of seven or more, preferably twelve or more films, makes it possible to obtain a liquid crystal display unit having the monochrome display practically applicable. In addition, in order to obtain an improved display characteristic when the number of films to be used is small, it is extremely effective to adjust the arrangement of the polarizers 1 and 8, or each film to be used.

Figure 5:
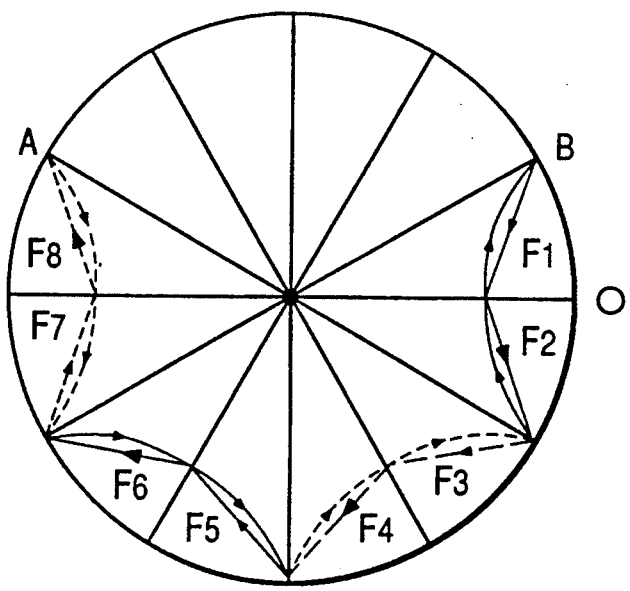
FIGS. 5 and 6 are diagrams showing characteristic changes of the state of polarization in the liquid crystal layer and film layer.

This EXAMPLE emphasizes that the number of films required to be used is slightly large, but the optical compensation means 7 is easy to design and the liquid crystal layer used for the optical compensation purpose can be replaced by films without requiring any complex calculation. As a result, a liquid crystal display can be First, a liquid crystal display structured as shown in Table 1, No. 1 will be explained. In this case, the retardation ($\Delta n \cdot d$) was 0.82 $\mu$m and the twist angle of the liquid crystal layer was 240 deg. FIG. 5 shows the change of state of polarization of a light of 550 nm in wave length propagating the liquid crystal layer and film layers when a voltage is not applied thereto, in which right-handed circularly polarized light is taken as the north pole and left-handed circularly polarized light is taken as the south pole and the Poincare sphere thus obtained is looked from the infinite point of the north pole direction. In this case, the equator (indicated by the circumference of the circle in FIG. 5) corresponds to linearly polarized light, and northern hemisphere and southern hemisphere correspond to right-handed elliptically polarized light and left-handed elliptically polarized light, respectively. As the latitude on the sphere becomes high, that is, as a point in this figure approaches to the center of this circle, the ellipticity of a polarized light becomes large, which means that the state of polarization nears circular polarization. Also, the latitude of the Poincare sphere corresponds to twice of the azimuth of elliptically polarized light. As the reference of azimuth was taken the horizontal direction in FIG. 2 and as the reference of the latitude was taken the O-point in FIG. 5.

In FIG. 5, points laid in the northern hemisphere are expressed by continuous lines and a point laid in the southern hemisphere are expressed by short dashes lines. A light sent from the light source 10 is linearly polarized by passing through the polarizer 1 and after made to the state shown at point A in FIG. 5, it goes into the liquid crystal layer 4. The light changes the state of polarization as passes through the liquid crystal layer 4 as shown in curves of FIG. 5 and goes out from the liquid crystal layer 4 under the state shown at point B. This state can be calculated by the method proposed by Goscianski (see Journal of Applied Physics Vol. 48, No. 4 (April 1977), pp. 1426–1431), or by Berremann (see Journal of the Optical Society of America, Vol. 62 No. 4 (April 1977), pp. 502–510). In addition, by measuring the state of polarization using a set of liquid crystal panels each having a liquid crystal layer whose thickness and twist angle proportionally vary, this state can be determined experimentally. The light passed through the liquid crystal panel 9 goes into the film layer 7. Each of uniaxial films has a function to rotate the Poincare sphere by $2\pi \cdot \Delta n \cdot d/\lambda$ (rad) with the straight line connecting the point of the principal axis direction on the equator and the center of the sphere as the rotation center. Where, $\lambda$ is the wave length of a light. According to the notation shown in FIG. 5, it is exhibited as that which makes the state of polarization linearly change on this figure. The state of polarization is, as shown in FIG. 5, returned to the state shown at point A while orderly connecting points on the curve from F1 through F8, thereafter the light thus returned going out from the film layer 7.

The optical compensation liquid crystal layer of two-layer type liquid crystal panel shown as an example of the prior art is such that the state of polarization is returned to the original state by reversely following up the change of the state of polarization of the first liquid crystal layer faithfully. The film layer 7 of the liquid crystal display of this invention is approximated to this as shown above. This approximation can be satisfied by a single wave length light, but if a highly visible light with a wave length of about 550 nm is considered as this single wave length light, any lights having a wave length zone which has a large effect on the contrast property can be returned to a preferable linearly polarized light. Also, referring to the dependence of transmittance on wave length, since these lights lie between a blue light which is short in wave length and a red light which is long in it, deviation of blue light or red light from the approximation is small, so that considerably satisfactory compensation characteristic can be obtained. Particularly, if a structure which is small in the dependence on wave length is selected through calculations or experiments from a plurality of structures determined by the approximation using a light of 550 nm in wave length, the dependence on wave length can be further reduced. The plane of vibration of the electric vector of the polarizer 8 disposed on the output side was arranged so as to make a right angle with that of the polarizer disposed on the input side. The optical compensation means 7 structured as shown above served to act approximately identically to the optical compensation liquid crystal layer of two-layer type liquid crystal display.

When a voltage was not applied to the liquid crystal layer 4, or when a non-selected voltage was applied thereto by the signal voltage applying means 11, the black display was obtained satisfactorily, and when a selected voltage was applied to the liquid crystal layer 4 by the signal voltage applying means 11, satisfactory white display was obtained.

Next, a liquid crystal display structured as shown No. 2 in Table 1 will be explained.

Figure 6:
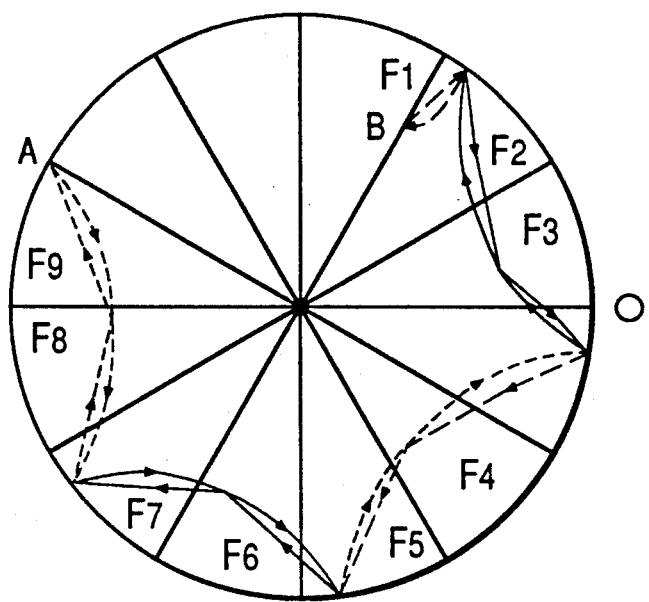

FIG. 6 shows, similarly to FIG. 5, the change of state of polarization of a light 550 nm in wave length propagating through the liquid crystal layer and the films layer. In this EXAMPLE, as the value of $\Delta n \cdot d$ of the liquid crystal layer was 0.9 $\mu$m which was larger than that of the preceding EXAMPLE, one film was added to eight films of the preceding EXAMPLE, which has a $\Delta n \cdot d$ value slightly smaller that of these eight films, thus nine films in total being laminated. By using the films layer 7 having nine films arranged as shown in No. 2 of Table 1, the optical compensation was carried out as shown in FIG. 6. When the films layer was arranged as shown in No. 3 through No. 6 of Table 1, the optical compensation was carried out based on the same principle.

Figure 7:
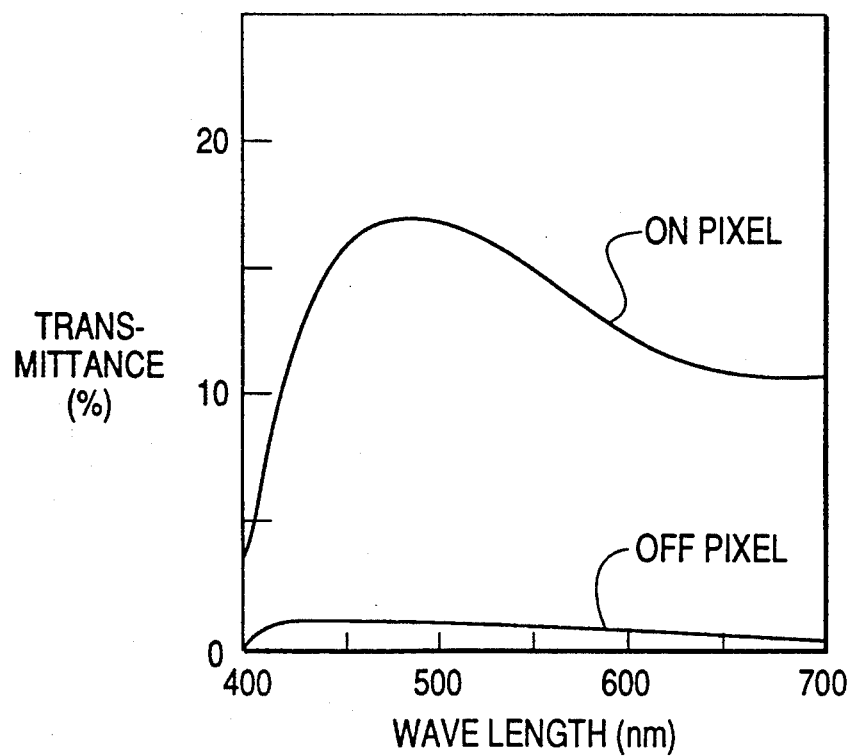
FIG. 7 is a characteristic diagram showing the transmittance spectra of the liquid crystal display of the invention.
Figure 8A:
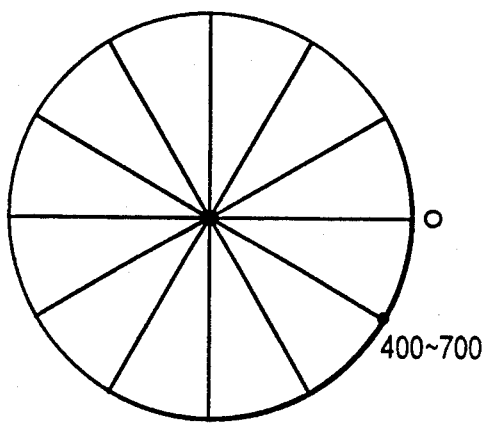
FIG. 8 (a-d) is a characteristic diagram showing the dependence of state of polarization on wave length.
Figure 8B:
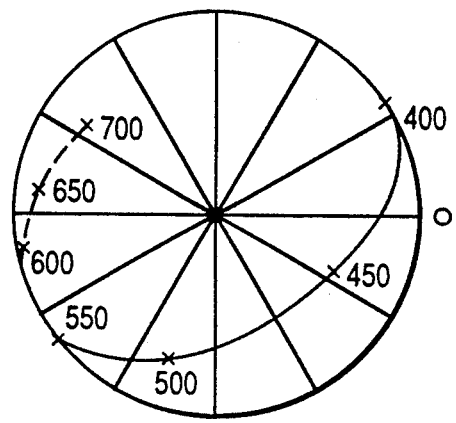
Figure 8C:
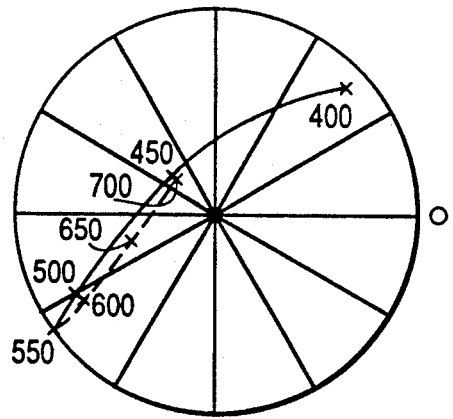
Figure 8D:
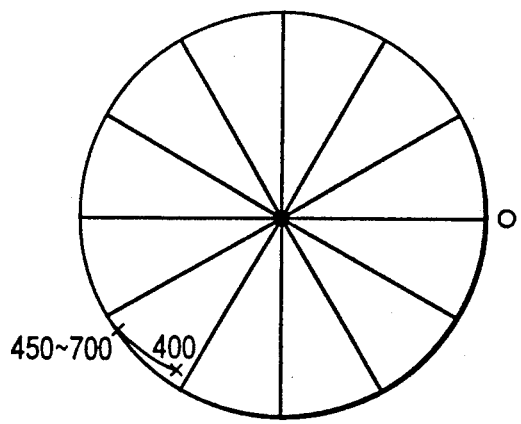

When a display signal voltage was applied to each pixel through the signal voltage applying means 11 using the voltage selection scheme (driving method of Alt and Pleshko type; see IEEE Transactions on Electron Devices Vol. ED-21, No. 2 (February 1974) pp. 146–155), transmission spectra of the selected and non-selected pixels were as shown in FIG. 7 under the driving condition of 1/200 duty, whose display characteristic was compared favorably with that of the conventional two-layer type liquid crystal display.

In such a structure, the use of films makes the use of the second liquid crystal layer unnecessary, thus being capable of obtaining a liquid crystal display unit small in thickness, light in weight and low in cost. The optical compensation means 7 of this EXAMPLE is slightly complex in design as compared with that of the preceding one, but it features to be obtainable satisfactory compensation characteristic by using films which are approximately identical in number thereto.

As described above, according to this EXAMPLE, a liquid crystal display which has an outstanding monochrome display characteristic and light-weight and low-cost features can be obtained by having at least one sheet of birefringent film whose optical principal axis is arranged so as to have its direction different from those of other films laminated.

In addition, the optical compensation means 7 of this EXAMPLE was disposed at the side from which observation was made against the liquid crystal panel 9, but the same effect can be obtained when it was disposed at the reverse side thereto. Further in addition, the liquid crystal display of this EXAMPLE is made to equip with a light source 10, but it can be structured so as to use the outdoor daylight with a help, for example, of a reflector.

Still further in addition, the arrangement of films is not limited to those shown in Table 1, and even when their arrangement is made so that the wave length for doing approximation or the section of approximation may differ from that shown in this EXAMPLE, the same effect can be obtained. Also, the display characteristic can be finely controlled by slightly changing the arrangement of the polarizers 1 and 8 or the films.

EXAMPLE 1-3

This EXAMPLE is to reduce the number of films by giving consideration upon the dependence of state of polarization on wave length after passing through the liquid crystal layer 4. Namely, the dependence of state of polarization on wave length after passing through the liquid crystal layer 4 is determined through calculations or experiments, and the arrangement of films is made so as to cancel the dependence on wave length thus determined theoretically or experimentally. Table 2 shows examples of the arrangement of each layer of the liquid crystal display of this EXAMPLE according to the notation of FIG. 4.

TABLE 2

| No. | The number of films | P1 (deg) | P2 (deg) | Liquid crystal layer | | | Compensation film layer (upper; $\Delta n \cdot d$ ($\mu m$), lower; $\Phi$(deg)) | | |
|---|---|---|---|---|---|---|---|---|---|
| | | | | $\Delta n \cdot d$ ($\mu m$) | $\Phi 0$ (deg) | $\Omega 0$ (deg) | 1st | 2nd | 3rd |
| 1 | 2 | −15 | 19 | 0.85 | 30 | −240 | 0.07 | 0.55 | — |
| | | | | | | | 30 | 70 | — |
| 2 | 2 | −15 | 11 | 0.90 | 30 | −240 | 0.08 | 0.63 | — |
| | | | | | | | 7.5 | 65 | — |
| 3 | 3 | −15 | 35 | 0.90 | 30 | −240 | 0.075 | 0.52 | 0.02 |
| | | | | | | | 62 | 80 | −75 |

The operation of the liquid crystal display having structured as shown No. 1 of Table 2 will be explained.

FIG. 8 shows that the light passed through each structural member is shown on the Poincare sphere in which its dependence on wave length is looked from the infinite point at the north pole side.

The state of polarization of the light passed through the polarizer 1 was a linearly polarized light having a certain plane of vibration of the electric vector independently of the wave length as shown in FIG. 8 (a). However, this light became to have the state of polarization largely dependent on the wave length after passing through the liquid crystal panel as shown in FIG. 8 (b). In this EXAMPLE, the first film acted to make the distribution of state of polarization approximately linear on this figure, and the dependence of state of polarization on wave length after passing through the first film became as shown in FIG. 8 (c). The second film acted so that the light made to have the state of polarization approximately linearly distributed on the figure can be condensed peripherally of the linearly polarized light having a certain plane of vibration of the electric vector. The light thus passed through the second film became to have the state of polarization as shown in FIG. 8 (d). The optical compensation means 7 having such a characteristic is not one that has been entirely approximated the characteristic of liquid crystal layer used for the optical compensation purpose of the conventional two-layer type liquid crystal display, but reduced and compensated only the dependence of state of polarization on wave length of the liquid crystal panel used for the display purpose, so that the output light showed the state of polarization different from that of an input light.

As a result, the plane of vibration of the electric vector of the polarizer 8 disposed at the output side did not necessarily make a right angle with the plane of vibration of the electric vector of the polarizer 1 disposed on the input side, but was arranged such as to be approximately perpendicular to the plane of vibration of the electric vector of the output light.

FIG. 8 (d) does not show the state of polarization completely condensed at a point, but shows a slight degree of dependence on wave length. However, this dependence on wave length is by far small as compared with that shown in FIG. 8 (b), and a highly visible light of about 550 nm in wave length can be satisfactorily linearly polarized, thus being capable of operating the black display enough to be practically applicable. In addition, by additionally using a film with a value of $\Delta n \cdot d$ of about 0.05 $\mu m$ and controlling its arrangement, the display characteristic can be further improved.

In this EXAMPLE, because the number of films to be used is so small as two to three, the display unit can be more reduced in cost and weight than the preceding EXAMPLE.

As described above, according to this EXAMPLE, a liquid crystal display which has an outstanding monochrome display characteristic and light-weight and low-cost features can be obtained by having at least one sheet of birefringent film whose optical principal axis is arranged so as to have its direction different from those of other films laminated.

In addition, the optical compensation means 7 of this EXAMPLE was disposed at the side from which observation is made against the liquid crystal panel 9, but the same effect can be obtained when it was disposed to the reverse side thereto. Further in addition, the liquid crystal display of this EXAMPLE is made to equip with a light source 10, but it can be structured so as to use the outdoor daylight with a help, for example, of a reflector. Still further in addition, the arrangement of films is not limited to those shown in Table 2, and even when their arrangement is made differently from that shown in this EXAMPLE, the same effect may be obtained. Also, the display characteristic can be finely controlled by slightly changing the arrangement of the polarizers 1 and 8 or the films.

EXAMPLE 2

Next, the liquid crystal display showing a second EXAMPLE of this invention will be explained. With the arrangement of the polarizers, liquid crystal layer and film layer shown in each of the above-mentioned EXAMPLE, if the plane of vibration of the electric vector of either the polarizer 1 or 8 is arranged with a rotation of 90 deg., the normally white mode which becomes the bright condition when a voltage is not applied results. With such an arrangement as above, however, the transmittance during the black display mode when a selected voltage is applied to the liquid crystal layer 4 becomes slightly large, so that the contrast is insufficient. Thus, by arranging the plane of vibration of the electric vector of the polarizer 1 and/or the polarizer 8 such as to be deviated at an angle of 5 to 10 deg. from this arrangement, satisfactory normally white type display can be obtained. The liquid crystal display of this EXAMPLE was slightly inferior in contrast to those of EXAMPLE 1, but the display brightness was improved. In addition, the optical compensation means 7 of this EXAMPLE was disposed at the side from which observation is made against the liquid crystal panel 9, but the same effect can be obtained when it was disposed at the reverse side thereto.

Further in addition, the display unit of this EXAMPLE can have the optical compensation means 7 disposed at each side of the liquid crystal panel 9. Also, the display unit of this EXAMPLE is made to equip with a light source 10, but it can be structured so as to use the outdoor daylight with a help, for example, of a reflector.

EXAMPLE 3

Next, the liquid crystal display showing a third EXAMPLE of this invention will be explained while referring to the drawings.

Figure 9:
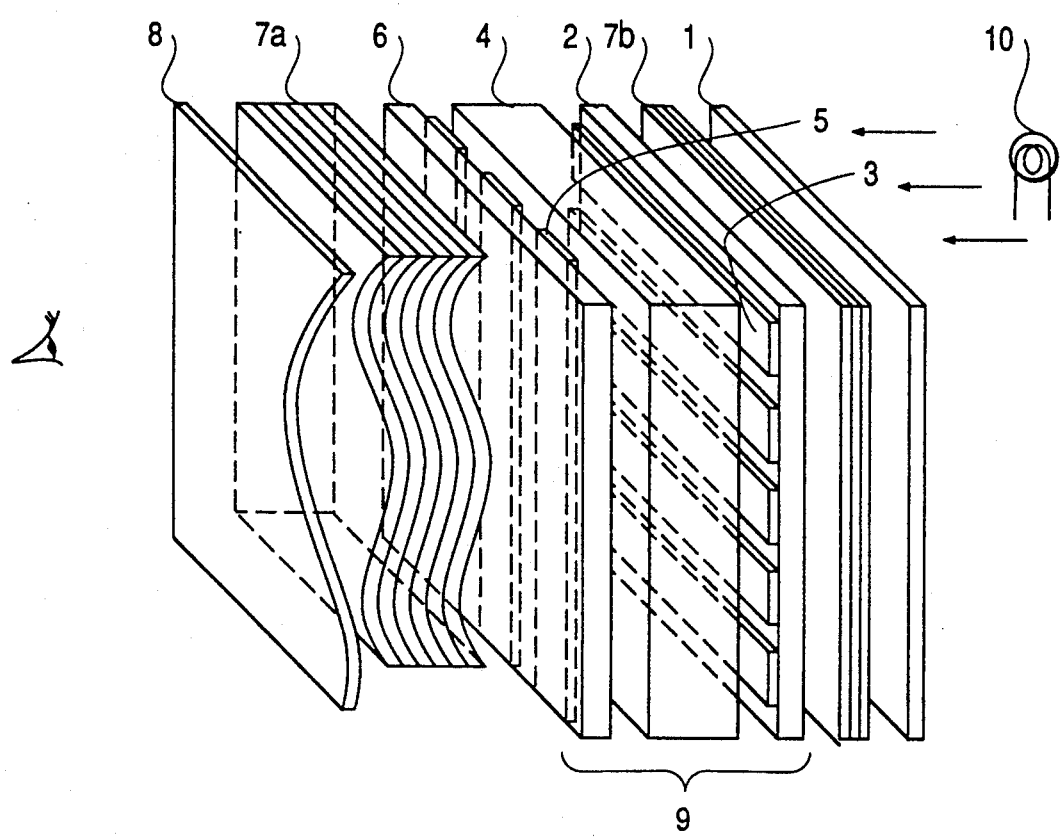
FIGS. 9, 10 and 11 are exploded views showing other examples of the liquid crystal display of this invention.

FIG. 9 shows the liquid crystal display structured so that the liquid crystal panel can have an optical compensation layer disposed at each side thereof as respectively indicated at 7a and 7b. In this EXAMPLE, the optical compensation means 7a and 7b can be structured in such a pattern that, for example, the characteristic of the half of the liquid crystal layer 4 on the observer side is compensated by the optical compensation means 7a disposed at its side, and the characteristic of another half of the liquid crystal layer 4 at the reverse side thereto can be compensated by the optical compensation means 7b. In this case, the characteristic obtainable is almost identical to those of the above-mentioned EXAMPLEs, but films can be separatedly used at the both sides of the liquid crystal layer 4, so that the number of films to be laminated at one side thereof can be reduced, resulting in an ease to manufacture, which constitutes a feature of this EXAMPLE. In addition, if arranged on a symmetrical consideration basis, an equal set of the films and the polarizer can be used at each side of the liquid crystal layer, which means that commonization of parts can be improved.

In addition, the structure of the optical compensation means 7a and 7b is not limited to that shown in this EXAMPLE. Based on the same principle as in EXAMPLE 1-3, the polarizer 1, the optical compensation means 7b and the liquid crystal panel 9 are arranged so that the dependence on wave length expressed by the notation shown in FIG. 8 can have a linear distribution as seen in FIG. 8 (c), and the light thus obtained can be linearly polarized with a small wave length distribution as shown in FIG. 8 (d) by the optical compensation means 7a.

Further in addition, the liquid crystal display of this EXAMPLE is made to equip with a light source 10, but it can be structured so as to use the outdoor daylight with a help, for example, of a reflector.

EXAMPLE 4

Figure 10:
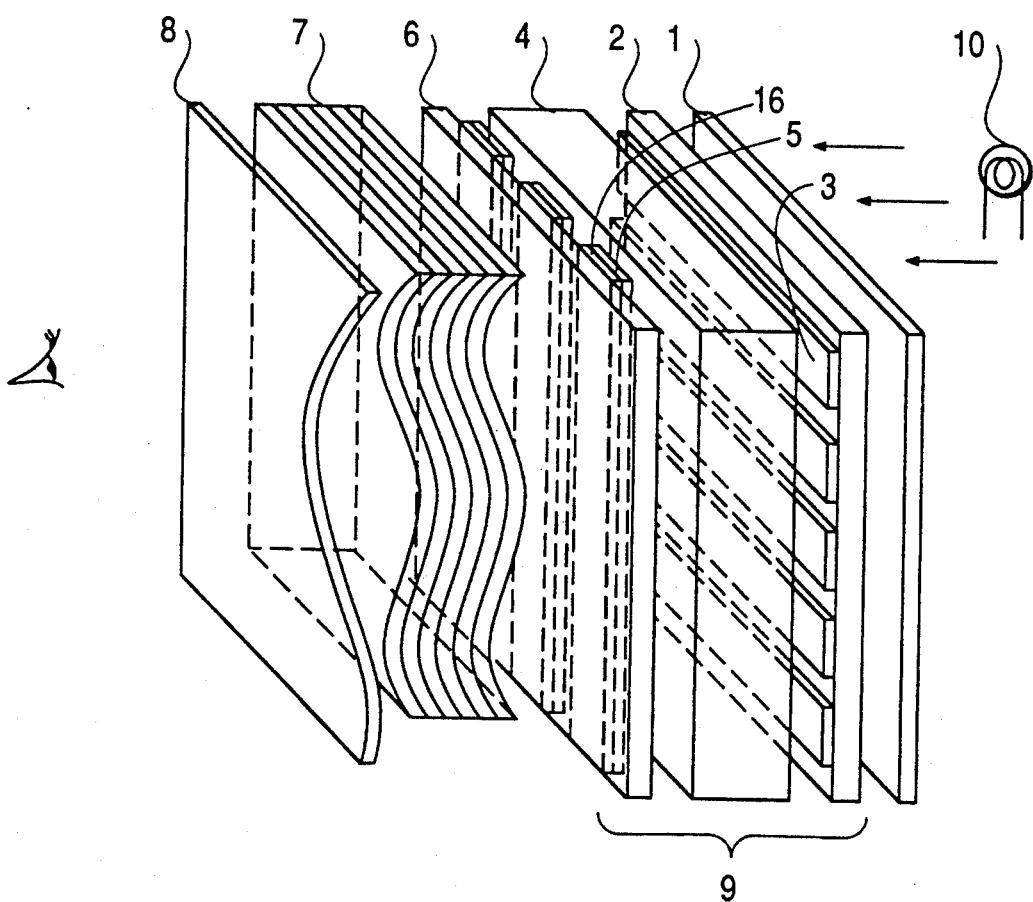

The liquid crystal display showing a fourth EXAMPLE of this invention will be explained while referring to the drawings. FIG. 10 is a liquid crystal display structured by having a color filter layer 16 added to the liquid crystal layer shown in FIG. 1. In this EXAMPLE, the optical compensation can be carried out in the same manner as in the display units shown in EXAMPLEs 1 through 3 did. Thus, a satisfactory color display or multicolor display can be made due to additive color mixture.

In addition, referring to FIG. 10, the color filter layer 16 is structured so as to have a stripe alignment between an electrode layer 5 and a substrate 6, but not limited to this structure. When a filter aligned in delta shape is used, or a color filter is used between the electrode layer 15 and the liquid crystal layer 4, its effect can be exerted in the same way.

Further in addition, the optical compensation means 7 was disposed at the side from which observation is made against the liquid crystal panel 9, but the same effect can be obtained when it was disposed at the reverse side thereto. Still further in addition, the display unit of this EXAMPLE can have the optical compensation means 7 disposed at each side of the liquid crystal panel 9. Also, the display unit of this EXAMPLE is made to equip with a light source 10, but it can be structured so as to use the outdoor daylight with a help, for example, of a reflector.

EXAMPLE 5

Figure 11:
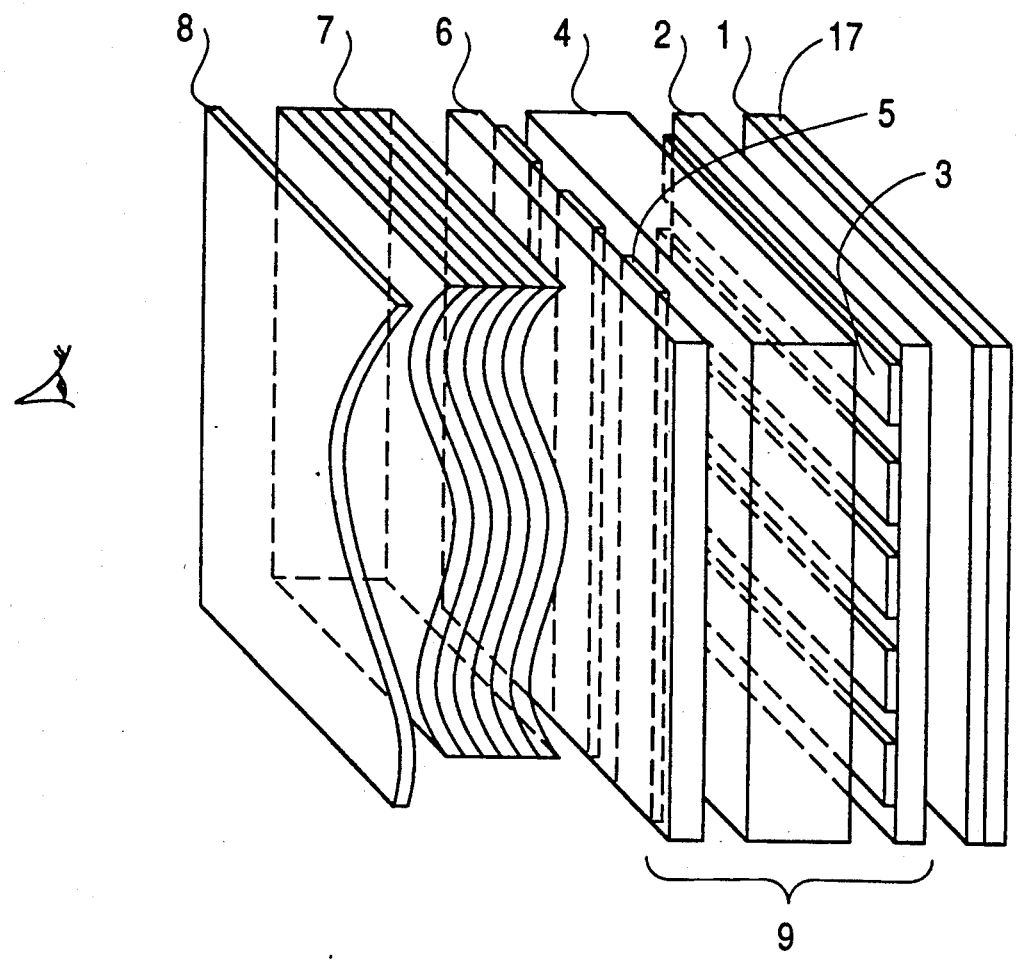

Next, the liquid crystal display showing a fifth EXAMPLE of this invention will be explained while referring to the drawings. FIG. 11 shows a reflection type liquid crystal display in which a reflector 17 is used instead of the light source 10 of the structure as shown in FIG. 1. In this EXAMPLE, the optical compensation can be carried out based on the same principle as that of the transmission type one. In the case of the reflection type unit with no use of a light source, however, to make the display bright is important as compared with the transmission type one. For this, it was effective to arrange the polarizers or films so as to be slightly deviated in angle from the arrangement shown in Table 1, or to do the normally white display. Table 3 shows the arrangement of the polarizers, liquid crystal layer and film layer of the liquid crystal display of this EXAMPLE.

TABLE 3

| No. | The number of films | P1 (deg) | P2 (deg) | Liquid crystal layer | | | Compensation film layer (upper; $\Delta n \cdot d$ ($\mu m$), lower; $\Phi$ (deg)) | | | | | | | |
| | | | | $\Delta n \cdot d$ ($\mu m$) | $\Phi 0$ (deg) | $\Omega 0$ (deg) | 1st | 2nd | 3rd | 4th | 5th | 6th | 7th | 8th |
| 1 | 8 | 80 | 5 | 0.90 | 30 | −240 | 0.11 | 0.11 | 0.11 | 0.11 | 0.11 | 0.11 | 0.11 | 0.11 |
| | | | | | | | −77 | −67 | −21 | −1 | 35 | 55 | 91 | 111 |
| 2 | 8 | 75 | 17 | 0.90 | 20 | −240 | 0.11 | 0.11 | 0.11 | 0.11 | 0.11 | 0.11 | 0.11 | 0.11 |
| | | | | | | | −93 | −73 | −37 | −17 | 19 | 39 | 75 | 95 |
| 3 | 2 | −15 | 19 | 0.85 | 30 | −240 | 0.07 | 0.55 | — | — | — | — | — | — |
| | | | | | | | 30 | 70 | — | — | — | — | — | — |
| 4 | 8 | 80 | −81 | 0.90 | 30 | −240 | 0.11 | 0.11 | 0.11 | 0.11 | 0.11 | 0.11 | 0.11 | 0.11 |
| | | | | | | | −77 | −67 | −21 | −1 | 35 | 55 | 91 | 111 |
| 5 | 8 | 75 | −73 | 0.90 | 30 | −240 | 0.11 | 0.11 | 0.11 | 0.11 | 0.11 | 0.11 | 0.11 | 0.11 |
| | | | | | | | −93 | −73 | −37 | −17 | 19 | 39 | 75 | 95 |
| 6 | 2 | −15 | −71 | 0.85 | 30 | −240 | 0.07 | 0.55 | — | — | — | — | — | — |

TABLE 3-continued

| No. | The number of films | P1 (deg) | P2 (deg) | Liquid crystal layer | | | Compensation film layer (upper; Δn · d (μm), lower; Φ (deg)) | | | | | | | |
|---|---|---|---|---|---|---|---|---|---|---|---|---|---|---|
| | | | | Δn · d (μm) | Φ0 (deg) | Ω0 (deg) | 1st | 2nd | 3rd | 4th | 5th | 6th | 7th | 8th |
| | | | | | | | 30 | 70 | — | — | — | — | — | — |

Referring to Table 3, Nos. 1 through 3 show examples of the normally black display and Nos. 4 through 6 show examples of the normally white display. Among them, EXAMPLEs of Nos. 1, 2, 4 and 5 use the optical compensation means which is structured by slightly modifying the optical compensation means shown in EXAMPLE 1-2 and those of Nos. 3 and 6 use the same optical compensation means as shown in EXAMPLE 1-3.

With the reflection type structure, a light passes through the liquid crystal layer two times, so that even those whose display is slightly difficult to see in the transmission type unit can be displayed comparatively good. Although the white display with a background of slightly purplish black was made in the normally black display mode and the black display with a background of slightly yellowish white was made in the normally white display mode, the degree of coloration was small in each case, thus the display characteristic enough to be applied practically being obtained. Referring to the display units shown in Nos. 1 and 4 of Table 3, their contrast property from the front face was slightly inferior to other units, but their visible angle was wider than that of other units. The reflection type liquid crystal display is frequently used as a comparatively inexpensive portable display terminal, which means that the light weight and low manufacturing cost which constitute features of this invention are used more effectively than the transmission type unit in such application.

In addition, similar to the above-mentioned EXAMPLEs, the optical compensation means of the liquid crystal display of this EXAMPLE can be disposed at the side of the reflector 17 against the liquid crystal panel 9, at each side of the liquid crystal panel 9. However, if the total thickness of the film layer disposed at the side of the reflector 17 is larger, double image will be caused to generate, so that it is preferable that the optical compensation means disposed at the side of the reflector 17 is less than about 0.5 mm in thickness.

In the above-mentioned EXAMPLEs, the optical compensation means 7 was made to be structured using uniaxially elongated high polymer films, but this is not limited to uniaially elongated high polymer films. That is, the use of films having an optical anisotropy makes it possible to obtain the same effect, so that, for example, films having two or more elongation axes, or films aligned to have the anisotropy (for example, cellophane) can be used. In addition, polyvinylalcohol was used with the uniaxially elongated high polymer film, but this is not limited to the polyvinyl-alcohol. For example, polyether sulfonate, polyester, polycarbonate, cellulose acetate, liquid crystal polymer and the like can be used. Further in addition, the arrangement of the films for making the optical compensation means 7, or the arrangement of the liquid crystal layer 4, and the polarizers 1 and 8 are not limited to those shown in the above-mentioned EXAMPLEs. When another arrangement using the structure in accordance with this invention is made, the dependence of the optical characteristic on wave length can be compensated and reduced thereby to make a satisfactory display characteristic obtainable.

Still further in addition, in the above-mentioned EXAMPLEs, as a method of varying the directions of the maximum refractive indices of the films for making the optical compensation means with depth, the method of adhering a birefringent film using an adhesive agent was adopted, however, it is possible to prepare that the birefringent film is undergone a fused adhesion, or films having been imparted the optical anisotropy through a pulling method are changed their pulling direction in a sequential manner to form.

Referring to the liquid crystal layer, the above-mentioned EXAMPLEs use STN type one, but it is not limited to this. Twisted nematic (TN) type liquid crystal layer having a twist angle of about 90 deg., electrically controlled birefringence (ECB) type liquid crystal layer using a liquid crystal whose dielectric anisotropy is positive or negative, ferroelectric liquid crystal layer using a chiral smectic liquid crystal, etc. can be used for improving the contrast property, color tone and visible angle characteristic.

In addition, referring to the panel structure, it is not limited to the case having the pixel aligned in the matrix shape resulting from the electrode layers aligned in the stripe shape. This invention is applicable to a liquid crystal display having the panel structure, for example, of being used a segment type electrode consisting of pixels shaped in the FIG. 8 or various kinds of patterns, or formed in active matrix type in which each pixel is equipped with a switching element.

What is claimed is:

1. A liquid crystal display comprising:
a liquid crystal panel having a liquid crystal layer of a twisted structure disposed between electrode layers;
two polarizers between which said liquid crystal panel is disposed; and
optical compensation means disposed at at least one side of said liquid crystal panel between said two polarizers to compensate for the dependence of the state of polarization on the wave length so that a black and white image is obtained, said optical compensation means being made of laminated solid multiaxially elongated high polymer films whose maximum refractive index direction is twisted in one direction with depth.

2. A liquid crystal display comprising:
a liquid crystal panel having a liquid crystal layer of a twisted structure disposed between electrode layers;
two polarizers between which said liquid crystal panel is disposed; and
optical compensation means disposed at at least one side of said liquid crystal panel between said two polarizers to compensate for the dependence of the state of polarization on the wave length so that a black and white image is obtained,
wherein said optical compensation means is made of laminated solid films which are multiaxially elongated high polymer films at least one of which is arranged in a direction such that the direction of the refractive index thereof differs from those of the remainder of the films.

3. A liquid crystal display comprising:

a liquid crystal panel having a liquid crystal layer of a twisted structure disposed between electrode layers;

two polarizers disposed at both sides of said liquid crystal panel; and optical compensation means disposed at each side of said liquid crystal panel between said two polarizers for compensating a dependence of the state of polarization on the wave length so that a black and white image is obtained, wherein said optical compensation means is made of multiaxially elongated high polymer films.

* * * * *